United States Patent
Dey et al.

(10) Patent No.: US 9,785,657 B2
(45) Date of Patent: *Oct. 10, 2017

(54) METHOD FOR SYNTHETIC DATA GENERATION FOR QUERY WORKLOADS

(71) Applicant: International Business Machines Corporation, Armonk, NY (US)

(72) Inventors: Atreyee Dey, Bangalore (IN); Prasan Roy, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 587 days.

This patent is subject to a terminal disclaimer.

(21) Appl. No.: 14/485,725

(22) Filed: Sep. 13, 2014

(65) Prior Publication Data
US 2015/0012523 A1 Jan. 8, 2015

Related U.S. Application Data (63) Continuation of application No. 13/934,232, filed on Jul. 3, 2013, now Pat. No. 9,244,950.

(51) Int. Cl.
G06F 17/30 (2006.01)
G06F 11/36 (2006.01)

(52) U.S. Cl.
CPC ........ G06F 17/30289 (2013.01); G06F 11/36 (2013.01)

(58) Field of Classification Search
CPC .............. G06F 17/30289; G06F 11/36; G06F 17/30958; G06F 9/5066; G06F 17/30395;
(Continued)

(56) References Cited

U.S. PATENT DOCUMENTS 6,279,124 B1 8/2001 Brouwer et al.
7,716,215 B2 5/2010 Lohman et al.
(Continued)

OTHER PUBLICATIONS

Semantic Chunk Annotation for questions using Maximum Entropy, Shixi Fan, pp. 450-454, 2008 IEEE International Conference on Systems, Man and Cybernetics (SMC 2008), http://ieeexplore.ieee.org/Xplore/login.jsp?tp=&arnumber=4811317.
(Continued)

Primary Examiner — Evan Aspinwall
(74) Attorney, Agent, or Firm — North Shore Patents, P.C.; Lesley A. Leonessa (57) ABSTRACT

Generation of synthetic database data includes annotated query subplans for a multiple table query workload that includes a desired cardinality for nodes (v) in the subplans. The subplans may be merged and represented by a direct acyclic graph (DAG). The maximum entropy joint probability distribution for each attribute (x) for each node (v) is determined as:

$$p(x) = \exp\left[\left(\frac{\sum_v w_v f_v(x)}{Z}\right)\right]$$

for each node v, where $w_v$ is a weight of node v, $f_v$ is a conjunct of predicates in a subplan rooted at node v, and Z is a normalization factor. This distribution is determined such that the desired cardinality, and selectivities for each node v determined from the desired cardinality, are satisfied. The data for a plurality of tables are generated by sampling the maximum entropy joint probability distribution for a
(Continued)

domain of attributes (x) of a plurality of tables. Data may be efficiently generated for multiple table queries and for DAGs.

7 Claims, 4 Drawing Sheets

(58) Field of Classification Search
CPC ......... G06F 17/30445; G06F 17/30463; G06F 17/30471; G06F 17/30477; G06F 17/30498; G06F 17/30528; G06N 7/005; G06N 5/02; G06N 7/06
USPC .......................................................... 707/718
See application file for complete search history.

(56) References Cited

U.S. PATENT DOCUMENTS

| | | | |
|---|---|---|---|
| 7,739,249 B2* | 6/2010 | Haham | G06F 11/3664 707/690 |
| 7,882,121 B2* | 2/2011 | Bruno | G06F 17/30424 707/690 |
| 2005/0246357 A1 | 11/2005 | Geary et al. | |
| 2006/0123009 A1 | 6/2006 | Bruno et al. | |
| 2009/0182756 A1 | 7/2009 | Kang et al. | |
| 2010/0250518 A1 | 9/2010 | Bruno et al. | |
| 2010/0312747 A1 | 12/2010 | Stolte et al. | |
| 2011/0035205 A1 | 2/2011 | Brideson et al. | |
| 2011/0153575 A1 | 6/2011 | Glasser et al. | |
| 2014/0012853 A1 | 1/2014 | Watanabe et al. | |

OTHER PUBLICATIONS

Arasu, A.; "Data Generation using Declarative Constraints"; SIGMOD 2007; Jun. 12-16, 2011; Athens, Greece; all pages.

Berger, A.; The Improved Iterative Scaling Algorithm: A Gentle Introduction; School of Computer Science, Carnegie Mellon University; Dec. 1997; all pages.

Berger, A.L. et al.; "A Maximum Entropy Approach to Natural Language Processing"; Computational Linguistics, vol. 22, No. 1; Mar. 1996; all pages.

Binnig, C. et al.; "QAGen: Generating Query-Aware Test Databases"; SIGMOD 2007; Jun. 11-14, 2007; Beijing, China; all pages.

Binning, C.; et al; "Towards Automatic Test Database Generation"; Bulletin of the IEEE Computer Society Technical Committee on Data Engineering; vol. 31, No. 1; Mar. 2008; pp. 28-35.

De La Riva, CL., et al.; "Constraint-based Test Database Generation for SQL Queries"; AST '10; May 3-4, 2010; Cape Town, South Africa; all pages.

Hoag, J.E.; et al.; "Applications of Synthetic Data Generation"; University of Arkansas, Fayetteville, Arkansas; Dec. 2007; all pages.

Jurafsky, D. et al.; "Speech and Language Processing: An Introduction to Natural Language Processing, Speech Recognition, and Computational Linguistics"; 2nd edition; Prentice Hall; 2009; all pages.

Malouf, R.; "A Comparison of Algorithms for Maximum Entropy Parameter Estimation"; Proceedings of the Sixth Conference on Natural Language Learning (CoNLL); 2002; pp. 49-55.

Pietra, S. D., et al.; Inducing Features of Random Fields; IEEE Transactions Pattern Analysis and Machine Intelligence, vol. 19, No. 4; Apr. 1997; all pages.

Rajkumari, R. et al; "Automatic Test Data Generation Using Genetic Algorithm and Program Dependence Graph"; Journal of Computer Applicatins, vol. 111, No. 4; Oct.-Dec. 2010; all pages.

Ratnaparkhi, A.; "A Simple Introduction to Maximum Entropy Models for Natural Language Processing"; Philadelphia, Pennsylvania; May 1997; all pages.

Wu, X., et al; "Privacy Aware Data Generation for Testing Database Applications"; Proceedings of the 9th International Database Engineering and Application Symposium (IDEAS05); Montreal, Canada; Jul. 25-27, 2005; pp. 317-326.

\* cited by examiner

METHOD FOR SYNTHETIC DATA GENERATION FOR QUERY WORKLOADS

BACKGROUND

Database management system users occasionally request support to improve the performance of queries on their database. In order to handle such user complaints, support engineers frequently need to study specific queries on the database and to recreate the problem scenario, which in turn requires access to the production data. However, while the users can share the queries, the database schema, and the runtime performance statistics, the production data is often confidential and cannot be accessed. Appropriate data must thus be synthesized which mimic the performance of the queries on the original data.

Approaches for synthesizing the data exist. However, when processing complex queries where there may be multiple constraints that must be satisfied simultaneously, these approaches require significant trial and error and consume valuable time and effort. Further, many of these approaches, although able to process tree-shaped query plans, are not capable of processing query plans represented by direct acyclic graphs (DAGs).

SUMMARY

According to one embodiment of the present invention, a computer implemented method for synthetic data generation includes the receiving of annotated query subplans for a multiple table query workload comprising a desired cardinality for a plurality of nodes (v) in the annotated query subplans. A maximum entropy joint probability distribution for each attribute (x) for each node (v) is determined as:

$$p(x) = \exp\left[\left(\frac{\sum_v w_v f_v(x)}{Z}\right)\right]$$

for each node v, wherein $w_v$ comprises a weight of node v, $f_v$ comprises a conjunct of predicates in a subplan rooted at node v, and Z comprises a normalization factor. The distribution is determined such that the desired cardinality, and selectivities for each node v determined from the desired cardinality, are satisfied. Data for a plurality of tables are generated by sampling the maximum entropy joint probability distribution for a domain of attributes (x) of a plurality of tables.

System and computer program products corresponding to the above-summarized methods are also described and claimed herein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Figure 1:
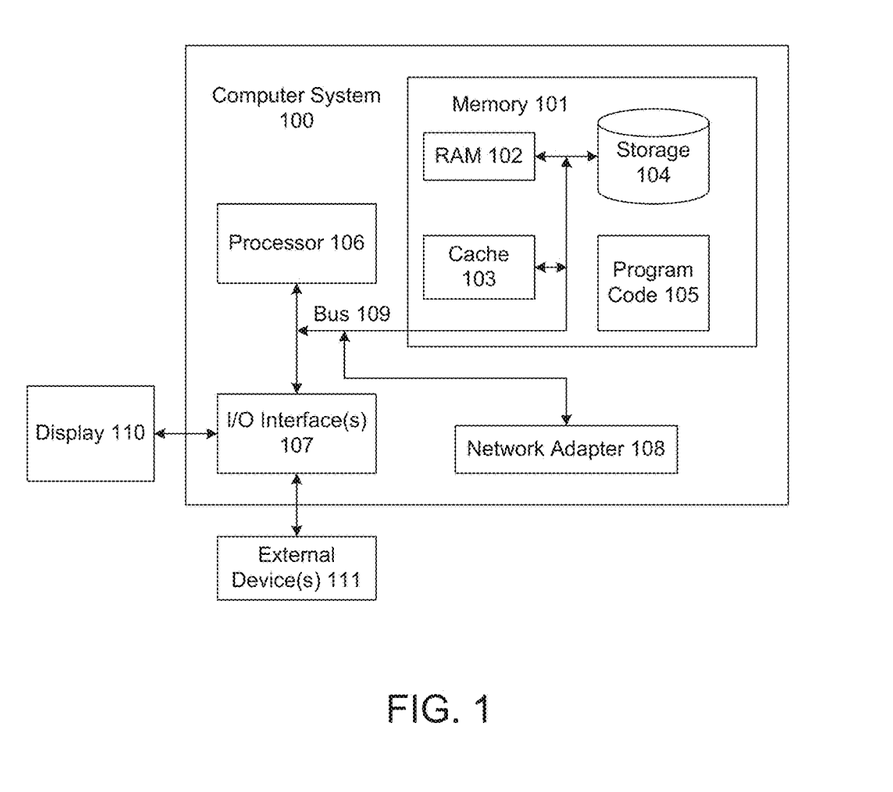
FIG. 1 illustrates an embodiment of a system for synthetic data generation according to the present invention.

FIG. 1 illustrates an embodiment of a system for synthetic data generation according to the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108.

In the embodiments of the present invention, the joint probability distribution of database data is estimated with the following expectation constraints: the expected cardinality of each intermediate result satisfies the cardinality specified in the annotated query plan; the selectivity of each predicate in the query plan satisfies the selectivity as determined from the cardinalities in the annotated query plan; and the joint probability distribution has the maximum entropy among the distributions satisfying the other two constraints. Cardinality refers to the number of distinct values in a particular column or attribute. Selectivity is determined as the ratio of the cardinality to the number of rows. The database tables are generated by sampling the joint probability distribution with the maximum entropy, such that each base table satisfies the cardinality specified in the annotated query plan.

Figure 2:
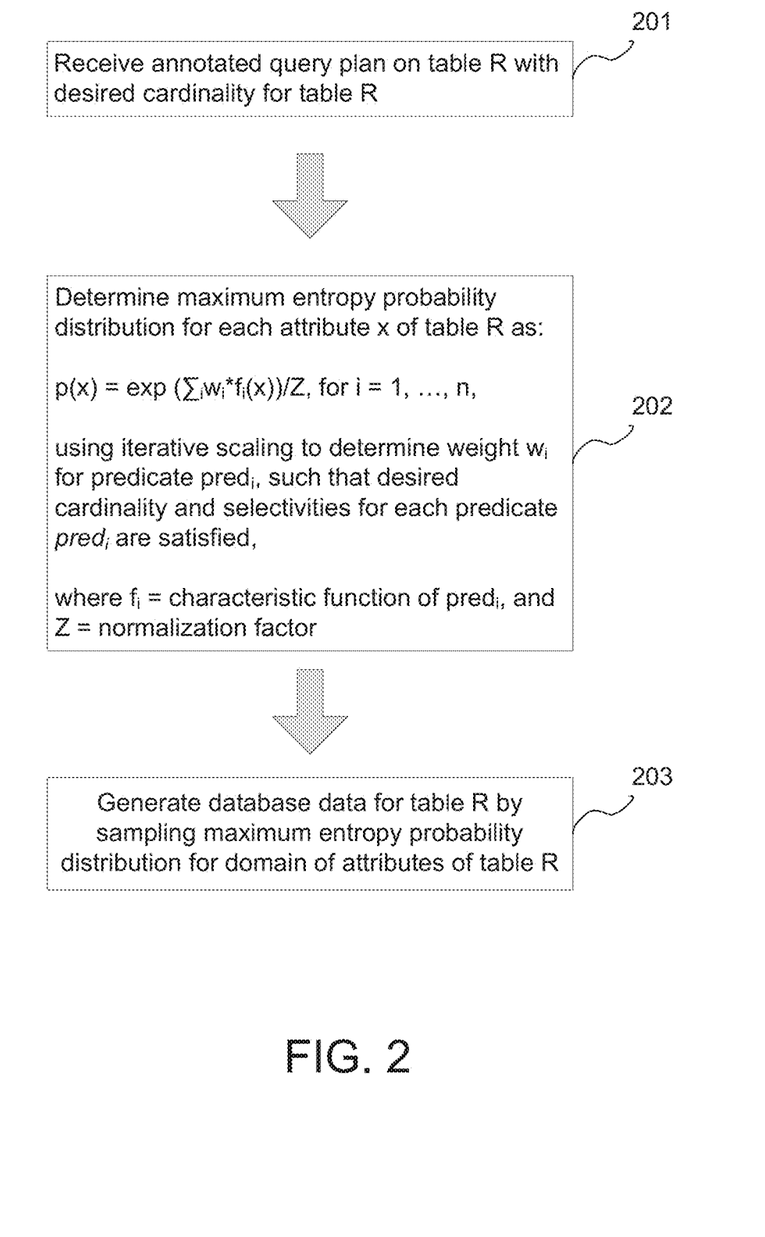
FIG. 2 illustrates an embodiment of a method for synthetic data generation for single table queries according to the present invention.
Figure 3:
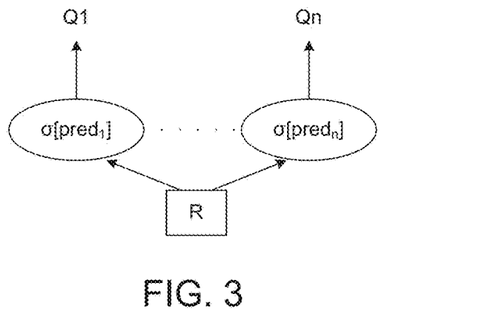
FIG. 3 illustrates an example DAG for a single table query.

FIG. 2 illustrates an embodiment of a method for synthetic data generation for single table queries according to the present invention. For example, the single table query can be of the form: SELECT * FROM R WHERE $pred_i$ (for table R and i=1, . . . , n). The annotated query plan on table R with the desired cardinality for table R is received (201). In this embodiment, the plan is represented as a directed acyclic graph (DAG). Consider the example DAG illustrated in FIG. 3 for a single table query. Here, Q1, . . . , Qn are queries on a single table R, filtered according to the predicates $pred_1 \ldots pred_n$. Returning to FIG. 2, from the cardinality for table R, the desired selectivities for the predicates ($pred_i$) are determined. The maximum entropy probability distribution is determined (202) for each attribute x of table R as:

$$p(x) = \exp\left[\left(\frac{\sum_i w_i f_i(x)}{Z}\right)\right]$$

for i=1, ..., n, where n is the total number of predicates in the query. Iterative scaling is used to determine the weight $w_i$ for predicate $pred_i$, such that the desired cardinality and selectivities are satisfied. Here, $f_i$ is the characteristic function of $pred_i$, and Z is the normalization factor. $f_i=1$ if attribute x satisfies $pred_i$, otherwise, $f_i=0$. The database data is then generated for table R by sampling the maximum entropy probability distributions for the domain of attributes of table R (203).

In this embodiment, the following iterative scaling algorithm may be used for determining the weight $w_i$ for $pred_i$:

---

IterativeScaling ($\{f_i, K[f_i], u_i\} \mid i = 1, \ldots, n\}$)
Initialize $w_i = u_i$ for each $i = 1, \ldots, n$
Repeat until convergence:

Let $p(x) = \exp\left[\left(\frac{\sum_i w_i f_i(x)}{Z}\right)\right]$

For each $i = 1, \ldots, n$:

Let $E_p[f_i] = \sum_x p(x) f_i(x)$

Update $w_i = w_i + \frac{1}{n\left(\log\frac{K[f_i]}{E_p[f_i]} - \log\frac{1-K[f_i]}{1-E_p[f_i]}\right)}$ Return $\{(f_i, w_i) \mid i = 1, \ldots, n\}$,

--- where $K[f_i]$ is the observed expectation of $f_i$ and $E_p[f_i]$ is the estimated expectation of $f_i$. In this embodiment, Gibbs sampling is used to compute $E_p[f_i]$ for each i in each iteration. Further in this embodiment, Gibbs sampling is used to sample the maximum entropy joint probability distribution to generate the database data for table R in the form of tuples (collection of attributes). Gibbs sampling is well-known in the art and will not be described in detail here.

Figure 4:
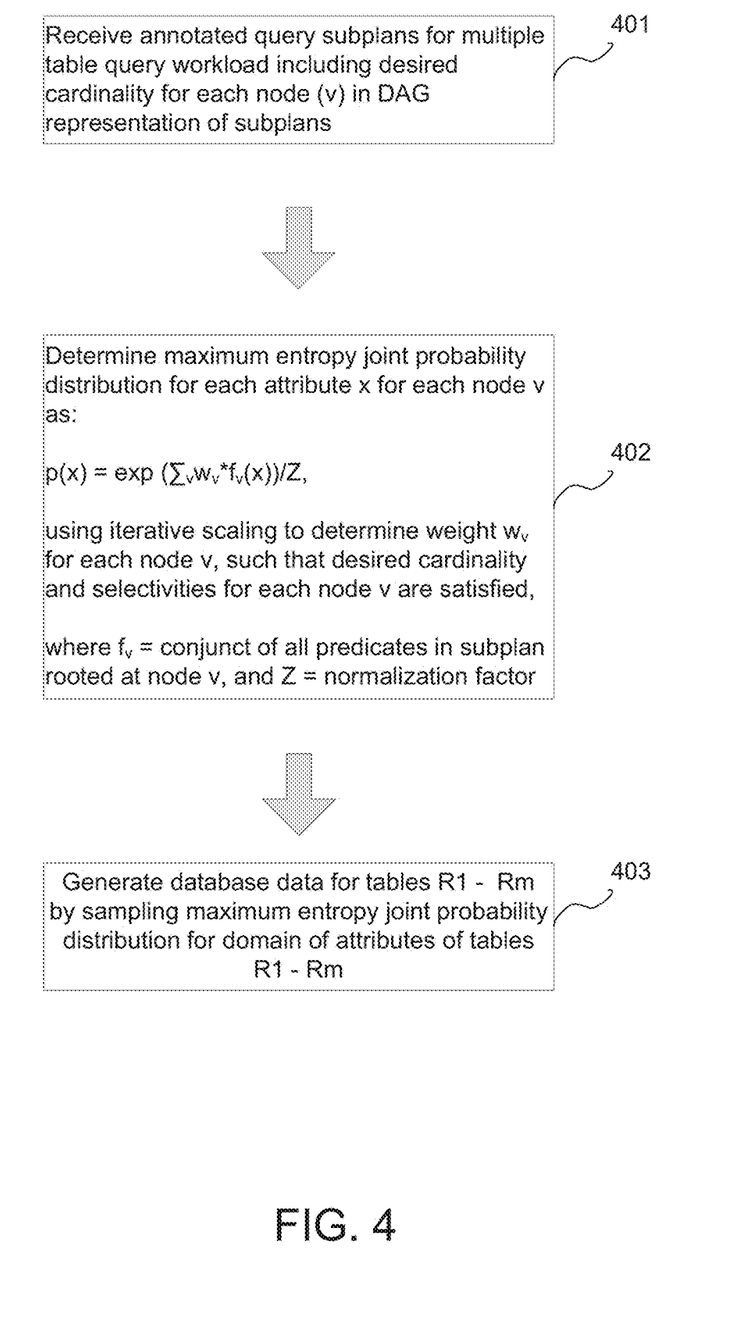
FIG. 4 illustrates an embodiment of a method for synthetic data generation for multiple table queries according to the present invention.

FIG. 4 illustrates an embodiment of a method for synthetic data generation for multiple table queries according to the present invention. Here, the query is on multiple tables, with predicates involving attributes or columns across different tables R1, ..., Rm, i.e., "join predicates". In this embodiment, the database tables are assumed to follow a snowflake schema, which includes centralized fact tables connected to multiple dimension tables. Each table contains a primary key, with the fact tables containing foreign keys to the dimension tables. The dimension tables may also have foreign keys to sub-dimension tables as well. In this embodiment, annotated query subplans for a query workload are received and includes the desired cardinality each node v (401). The subplans are merged and represented as a directed acyclic graph (DAG) by unifying the common subplans. The subplans include desired selectivities for each node v in the DAG. The maximum entropy joint probability distribution is determined (402) for each attribute x for each node v as:

$$p(x) = \exp\left[\left(\frac{\sum_v w_v f_v(x)}{Z}\right)\right]$$

for each node v. Iterative scaling is used to determine the weight $w_v$ of node v, such that the desired cardinality and selectivities for each node v are satisfied. Here, $f_v$ is the conjunct of all predicates in the subplan rooted at node v, and Z is the normalization factor. The selectivity of the subplan rooted at node v with input v1 is determined as:

$$\text{selectivity}(v) = \text{selectivty}(v1) * \frac{|v|}{|v1|}.$$

The database data is then generated for tables R1-Rm by sampling the maximum entropy probability distributions for the domain of attributes of tables R1-Rm (403), described further below.

Figure 5:
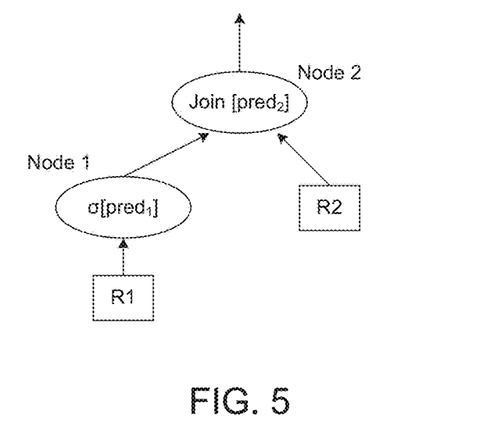
FIG. 5 illustrates an example DAG for a multiple table query involving fact table in a snowflake schema.

Consider the example DAG illustrated in FIG. 5 for multiple table queries. Here, the filters in the snowflake queries involve fact table attributes, and a join involves fact tables R1 and R2. Table R1 is filtered according to predicate $pred_1$ at Node 1. The table R1 is filtered according to the join of predicates $pred_1$ and $pred_2$ at Node 2. Iterative scaling is used to determine the weight $w_1$ at Node 1 for predicate $pred_1$. At Node 2, iterative scaling is used to determine the weight $w_2$ for predicate $pred_2$ and for $pred_1$ AND $pred_2$.

When snowflake queries where some filter predicates involve only dimension table attributes, i.e., "offending predicates", additional considerations are required. Here, consideration is given to the observation that a dimension table may be considered a "fact" table for a sub-dimension table. The joint distribution estimation may then be performed in a piecemeal fashion in a bottom-up order on the DAG, where the probability distribution for the lowest join node is determined first, and the filter intermediate result is used as a "primary key" input in the determination of the probability distribution for a higher level node.

Figure 6:
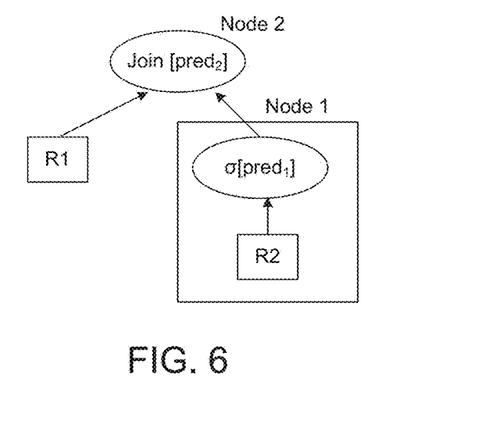
FIG. 6 illustrates an example DAG for a multiple table query involving dimension tables in a snowflake schema.

Consider the example DAG illustrated in FIG. 6 for multiple table queries involving dimension tables. Here, R1 and R2 are dimension tables in a snowflake schema. Upon traversing to Node 1, the probability distribution for R2 based on $pred_1$ is determined. The method then traverses to Node 2 and determines that Node 2 is an offending join where R2 is not the main branch. R2 can be considered a "fact" table to table R1. Note that any change to $pred_1$ at R2 will not affect the probability distribution for R2, since the join is at Node 2. Upon traversing to Node 2, the probability distribution for R1 is determined based on $pred_2$ and for $pred_1$ AND $pred_2$ as set forth with (402). The selectivity of node v in this case, where v is a foreign key join of inputs v1 and v2, where the foreign keys of v1 is equal to the primary keys of v2, is determined as:

$$\text{selectivity}(v) = \text{selectivty}(v1) * \frac{|v|}{|v1|}.$$

In this embodiment, the following iterative scaling algorithm may be used to determine the weight $w_v$ for node v:

IterativeScaling ({($f_v$, K[$f_v$], $u_v$) | v = 1, ..., n}, $n_{max}$)
Initialize $w_v = u_v$ for each i = 1, ..., n
Repeat until convergence:

$$\text{Let } p(x) = \exp\left[\left(\frac{\sum_v w_v f_v(x)}{Z}\right)\right]$$

For each v = 1, ..., $n_{max}$:

$$\text{Let } E_p[f_v] = \sum_x p(x) f_v(x)$$

$$\text{Update } w_v = w_v + \frac{1}{n\left(\log\frac{K[f_v]}{E_p[f_v]} - \log\frac{1-K[f_v]}{1-E_p[f_v]}\right)}$$

Return {($f_v$, $w_v$) | v = 1, ..., n}, where $f_v$ is the characteristic function of the conjunct of predicates at node v, K[$f_v$] is the observed expectation of $f_v$, and $E_p[f_v]$ is the estimated expectation of $f_v$. In this embodiment, Gibbs sampling is used to compute $E_p[f_v]$ for each v in each iteration. Convergence may be performed for v= 1, ..., $n_{max}$, such that 1<=$n_{max}$<=n. In other words, weight $w_v$=$u_v$ are modified only for v=1, ..., $n_{max}$. This recognizes that all foreign keys are a subset of the primary keys. Thus, once a set of foreign keys are considered in a lower join node, they need not be considered again for a higher node.

In this embodiment, the database data for tables R1-Rm are generated using Gibbs sampling. Tuples (or collection of attributes) are generated given the maximum entropy joint probability distribution for tables R1-Rm. Recognizing that primary keys are the domain for foreign keys, tables are generated in a bottom-up order, where dimension tables are generated before fact tables and where the tuples for a particular table are generated together. Optionally, when a target table generated using Gibbs sampling is large, a fixed-sized sample of the generated tuples may be used.

In this manner, data may be efficiently generated for multiple table queries and for query plans represented by DAGs.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for synthetic data generation, comprising:
   estimating a joint probability distribution of the data, wherein intermediate results are generated with a desired cardinality specified in an annotated query plan, wherein a selectivity of each predicate in the annotated query plan satisfies the selectivity as determined from the desired cardinalities in the annotated query plan, and wherein the joint probability distribution has a maximum entropy joint probability distribution satisfying i) the desired cardinalities of the intermediate results and ii) the selectivity of each predicate, by:
   receiving annotated query subplans for a multiple table query workload comprising a desired cardinality for a plurality of nodes (v) in the annotated query subplans;
   determining by a computing processor the maximum entropy joint probability distribution for each attribute (x) for each node (v),
   wherein the desired cardinality, and selectivities for each node v determined from the desired cardinality, are satisfied; and
   generating by the computing processor the data for a plurality of tables given the joint probability distribution by sampling the maximum entropy joint probability distribution for a domain of attributes (x) of the plurality of tables, wherein each of the plurality of tables satisfies the desired cardinality specified in the annotated query plan.

2. The method of claim 1, wherein the annotated query subplans are merged and represented as a directed acyclic graph (DAG), wherein the plurality of nodes (v) are nodes of the DAG.

3. The method of claim 2, wherein the plurality of tables follow a snowflake schema, wherein in determining the maximum entropy joint probability distribution for each attribute (x) for each node (v) for queries involving dimension table attributes, the method further:
   considers a dimension table as a fact table for a sub-dimension table;
   determines a probability distribution for the dimension table; and
   uses a filter intermediate result from the dimension table as a primary key input in
   determining a probability distribution in the sub-dimension table.

4. The method of claim 1, wherein the determining the maximum entropy joint probability distribution for each attribute (x) for each node (v) is performed using an iterative scaling algorithm to determine a weight $w_v$ for each node (v), wherein $w_v$ comprises a weight of node v.

5. The method of claim 4, wherein the iterative scaling algorithm comprises:
   repeating until convergence:

$$\text{Let } p(x) = \exp\left[\left(\frac{\sum_v w_v f_v(x)}{Z}\right)\right]$$

For each v = 1, ..., $n_{max}$:

$$\text{Let } E_p[f_v] = \sum_x p(x) f_v(x)$$

$$\text{Update } w_v = w_v + \frac{1}{n\left(\log\frac{K[f_v]}{E_p[f_v]} - \log\frac{1-K[f_v]}{1-E_p[f_v]}\right)}$$

wherein $f_v$ comprises a characteristic function of a conjunct of predicates at node v, K[$f_v$] comprises an observed expectation of $f_v$, $E_p[f_v]$ is an estimated expectation of $f_v$, and Z comprises a normalization factor.

6. The method of claim 1, wherein the sampling of the maximum entropy joint probability distribution for the domain of attributes (x) of the plurality of tables is performed using Gibbs sampling.

7. The method of claim 1, wherein the plurality of tables follow a snowflake schema, wherein in generating the data for the plurality of tables by sampling the maximum entropy joint probability distribution for the domain of attributes (x)

of the plurality of tables, the data for any dimension tables are generated before any fact tables.

* * * * *